(12) United States Patent
Dickman et al.

(10) Patent No.: US 6,415,818 B2
(45) Date of Patent: Jul. 9, 2002

(54) DIAPHRAGM-TYPE SOLENOID VALVE

(75) Inventors: Robert William Dickman; Shinichi Yoshimura, both of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/822,339

(22) Filed: Apr. 2, 2001

(30) Foreign Application Priority Data

Apr. 24, 2000 (JP) ........................................ 2000-122776

(51) Int. Cl.[7] ................................................. F15D 1/00
(52) U.S. Cl. ............................. 137/596.16; 251/30.01; 251/61.1
(58) Field of Search ..................... 137/596.14, 596.16; 251/331, 30.01, 30.02, 61.1, 61.5, 64

(56) References Cited

U.S. PATENT DOCUMENTS

| | | | |
|---|---|---|---|
| 4,617,961 A | * 10/1986 | Lichtenberg | ........... 137/596.16 |
| 4,717,116 A | * 1/1988 | Ishigaki | ................... 251/30.02 |
| 4,720,079 A | * 1/1988 | Iizuka et al. | ................. 251/331 |
| 4,783,044 A | * 11/1988 | Ellison | ................... 251/129.15 |
| 4,880,205 A | * 11/1989 | Ellison | ................... 251/129.15 |
| 5,836,570 A | * 11/1998 | Blenkush et al. | ........... 251/172 |

* cited by examiner

*Primary Examiner*—Henry C. Yuen
*Assistant Examiner*—John K Fristoe, Jr.
(74) *Attorney, Agent, or Firm*—Oblon, Spivak, McClelland, Maier & Neustadt, P.C.

(57) ABSTRACT

A diaphragm-type solenoid valve has a valve body 3 fixed onto a base, a diaphragm 4 for opening and closing a valve seat 13 provided to an inner end of a second port 12, a plate 5 for forming a driving chamber 14 between the plate 5 and the diaphragm sandwiched between the plate 5 and the valve body 3, and a pilot valve 6 for supplying pilot fluid pressure to the driving chamber 14. In the diaphragm, a disc 20 is encapsulated in a portion facing the port 12, a sealing rib 21 corresponding to the valve seat is provided, and cushion projecting portions 22 and 23 for coming in contact with cushion receiving portions 32 and 33 of the plate 5 in valve opening are formed behind the portion where the disc is encapsulated.

7 Claims, 5 Drawing Sheets

DIAPHRAGM-TYPE SOLENOID VALVE

TECHNICAL FIELD

The present invention relates to a diaphragm-type solenoid valve which is for use with various flow path structures by mounting the required number of solenoid valves onto a base and which is suitable for supplying and discharging special medical fluid which must not include foreign matter.

PRIOR ART

A diaphragm-type solenoid valve is conventionally known as a valve which can easily suppress inclusion of foreign matter or the like by independently forming a flow path for main fluid. However, because the diaphragm-type solenoid valve is generally formed as a single solenoid valve, it is difficult to easily connect the solenoid valve so as to obtain various flow path structures.

If the diaphragm-type valve is used for a flow path for fluid which must not include foreign matter or which is toxic, it is necessary to give sufficient consideration such that the diaphragm is not damaged due to fatigue or

DISCLOSURE OF THE INVENTION

The present invention has been accomplished to solve the above problems and it is basically a technical object of the invention to provide a diaphragm-type solenoid valve by which various flow path structures can be obtained by making it possible to mount valve bodies of the required number of diaphragm-type solenoid valves to a base having a proper flow path.

It is another technical object of the invention to provide a diaphragm-type solenoid valve in which a sliding portion and excessive deformation are generated nowhere in operation of a diaphragm and the diaphragm can be prevented from being damaged due to fatigue or the like.

To achieve the above objects, according to the invention, there is provided a diaphragm-type solenoid valve comprising a valve body having a first port and a second port in a mounting face to be mounted to a base, a valve seat mounted in a flow path connecting both the ports, a diaphragm for opening and closing the valve seat, a plate for sandwiching and fixing an outer peripheral portion of the diaphragm between the plate and the valve body, a driving chamber formed between the plate and the diaphragm to be separated from the flow path, and a pilot valve disposed on the plate to supply pilot fluid different from the main fluid to the driving chamber.

The diaphragm has a central main body portion for opening and closing the valve seat and an elastic support portion surrounding the main body portion, a disc is encapsulated in the main body portion, a sealing rib for coming in contact with and separating from the valve seat is provided to one face of the main body portion, and a cushion projecting portion for coming in contact with a cushion receiving portion of the plate in valve opening is formed on a back face of the main body portion.

In the diaphragm-type solenoid valve, diaphragm receiving faces in shapes patterned on a shape of the elastic support portion are formed on opposed faces of the valve body and the plate facing the elastic support portion of the diaphragm and the elastic support portion comes in contact with the diaphragm receiving faces in opening and closing of the diaphragm to thereby prevent excessive deformation of the diaphragm.

In the invention, it is preferable that the first port is in an annular shape and the second port opens at a center of the first port.

It is preferable that a pilot air supply hole and a pilot exhaust hole communicating with the pilot valve are provided to the mounting face of the valve body.

According to the invention, there is provided a diaphragm-type solenoid valve complex body formed by mounting one diaphragm-type solenoid valve onto a base having a supply port and an output port for main fluid and connecting each of the first and second ports to one of the supply port and the output port so as to have a function of a two-port valve by the solenoid valve and the base.

There is provided a diaphragm-type solenoid valve complex body formed by mounting a plurality of diaphragm-type solenoid valves onto a base having a supply port, at least one output port, and a discharge port for main fluid and connecting the supply port, the output port, and the discharge port to first and second ports of the respective solenoid valves by a connecting path in the base so as to have a function of a three-port valve by the plurality of solenoid valves and the base.

According to a concrete embodiment of the three-port valve, the base has first and second two output ports, first to fourth four diaphragm-type solenoid valves are mounted onto the base, the first ports of the first and second solenoid valves are respectively connected to the supply port, the second ports of the third and fourth solenoid valves are respectively connected to the discharge port, the second port of the first solenoid valve and the first port of the third solenoid valve are connected to the first output port, and the second port of the second solenoid valve and the first port of the fourth solenoid valve are connected to the second output port.

In the diaphragm-type solenoid valve of the invention, because the disc is encapsulated in the main body portion of the diaphragm and the cushion projecting portion for coming in contact with the cushion receiving portion provided to the plate in valve opening is formed behind the main body portion, impact force acting on the diaphragm in valve opening can be absorbed to protect the diaphragm. Furthermore, because the diaphragm receiving faces for preventing excessive deformation of the diaphragm when the diaphragm is pressed by operating force of the fluid are formed at faces of the valve body and the plate opposed to the main body portion, excessive deformation is generated nowhere in operation of the diaphragm and the diaphragm can be prevented to the utmost from being damaged due to fatigue or the like.

By mounting the diaphragm-type solenoid valve on a base having a flow path connected to the first and second ports to open and close the flow path, it is possible to form a complex valve having a function of a two-port valve or a three-port valve by the diaphragm-type solenoid valve and the base to obtain various flow path structures according to the flow path provided in the base.

DETAILED DESCRIPTION

Figure 1:
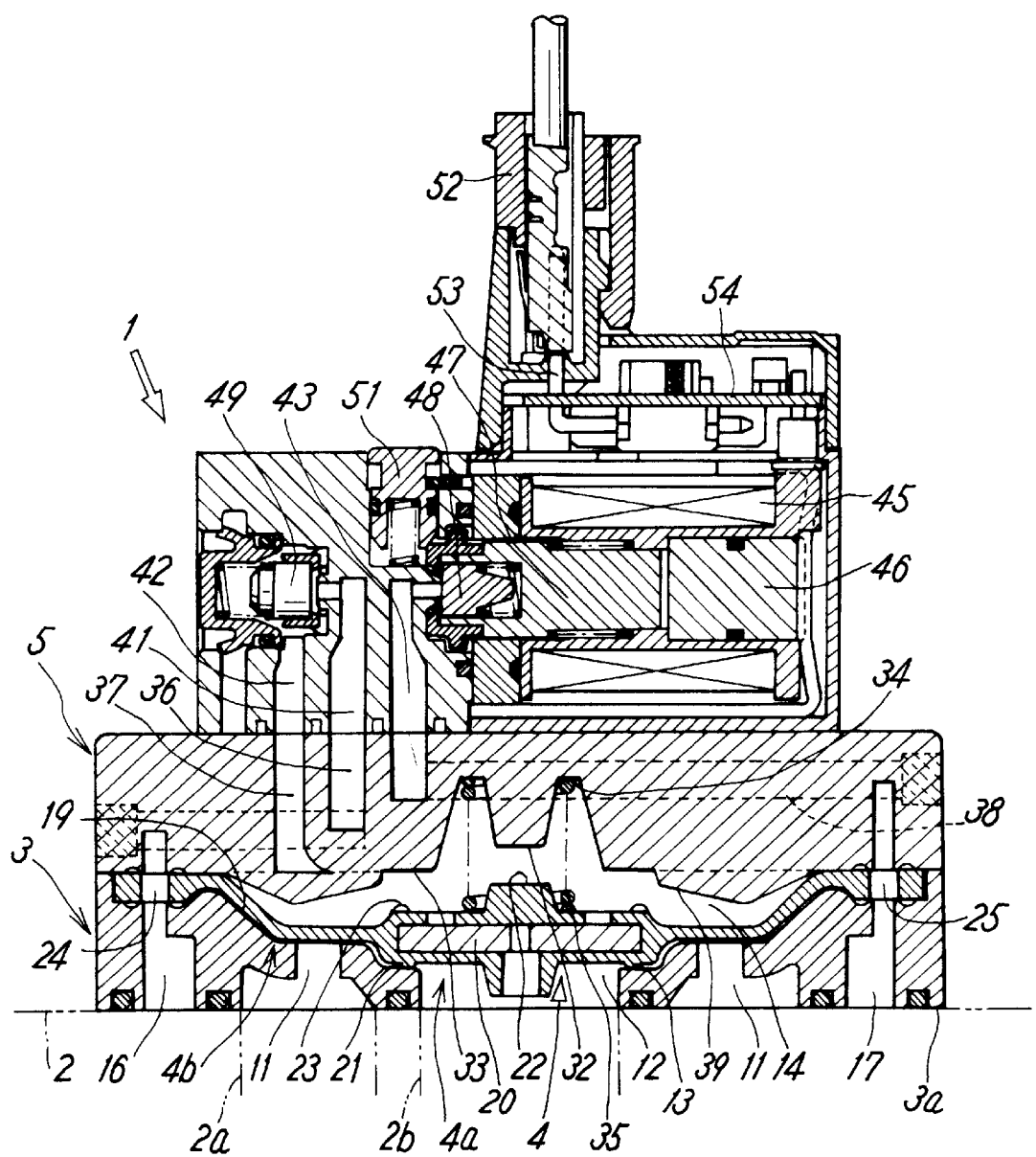
FIG. 1 is a sectional view of a first embodiment of a diaphragm-type solenoid valve according to the present invention.

FIG. 1 shows a first embodiment of a diaphragm-type solenoid valve according to the present invention.

The diaphragm-type solenoid valve 1 of the first embodiment is used in a state in which the valve is mounted onto a base 2, and more specifically, a base 2A or 2B which will be described later by means of FIGS. 4 and 6. The solenoid valve 1 includes a valve body 3 having in a mounting face 3a to be fixed to the base a first port 11 and a second port 12 communicating with two flow paths 2a and 2b opening on the base, a valve seat 13 formed at a mouth edge portion of the second port 12 in a flow path connecting both the ports 11 and 12, a diaphragm 4 for opening and closing the valve seat 13, a plate 5 for sandwiching and fixing an outer peripheral portion of the diaphragm 4 between the plate 5 and the valve body 3, a driving chamber 14 formed between the plate 5 and the diaphragm 4 to be separated from the flow path, and a pilot valve 6 disposed on the plate 5 to supply pilot fluid which is different from main fluid to the driving chamber 14. A diaphragm valve main body formed of the valve body 3, the diaphragm 4, and the plate 5 is assembled by seating the diaphragm 4 on the valve body 3, placing the plate 5 on the diaphragm 4, and fastening the plate 5 to the valve body 3.

Figure 2:
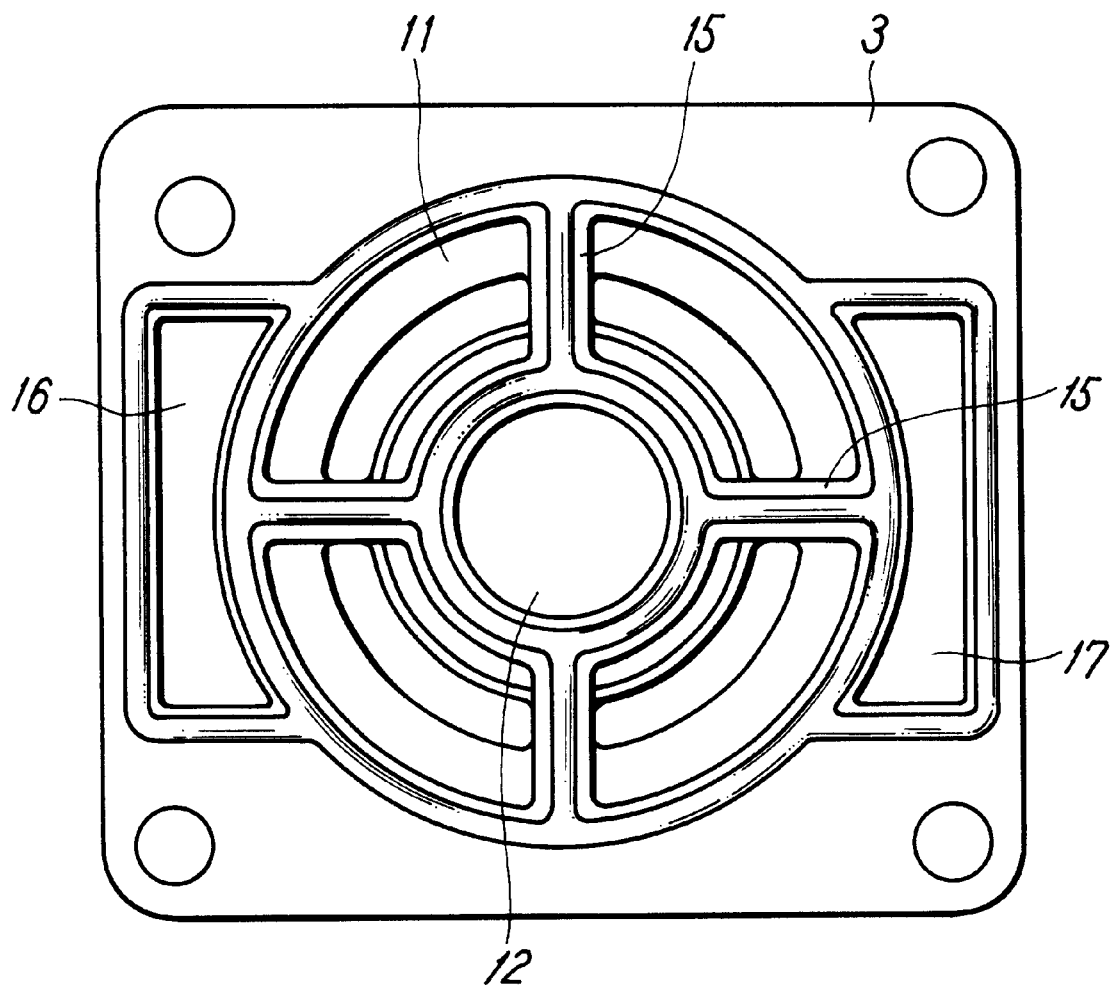
FIG. 2 is a bottom view of the diaphragm-type solenoid valve.

As shown in FIG. 2, the first port 11 is in an annular shape, the second port 12 is provided to a central portion of the first port 11, a peripheral wall of the first port 11 and a peripheral wall of the second port 12 are connected to each other by a plurality of bridges 15 positioned in radial directions, and the valve seat 13 is provided to a periphery of an inner end of the second port 12. However, the valve seat 13 may be provided to the first port 11 side or to inner ends of both the ports 11 and 12. In the mounting face 3a of the valve body 3, a pilot air supply hole 16 and a pilot exhaust hole 17 open outside the first port 11.

The diaphragm 4 is made of material having rubber elasticity and has a central main body portion 4a for opening and closing the valve seat 13 and an annular elastic support portion 4b surrounding the main body portion 4a. In the main body portion 4a, a hard disc 20 is encapsulated. The disc 20 is formed to be slightly larger than a diameter of the valve seat 13. A sealing rib 21 is formed on one face of the main body portion 4a to face the valve seat 13 at a peripheral portion of the disc 20 and a cushion projecting portion 22 in a central position and the large number of small cushion projecting portions 23 at a peripheral portion are formed respectively on a back face of the main body portion 4a. The cushion projecting portions 22 and 23 come in contact with cushion receiving portions 32 and 33 provided to the plate 5 in valve opening when the diaphragm 4 separates from the valve body 3 and absorb impact force acting on the diaphragm 4 in valve opening.

An inner bottom of an annular groove formed around the protruding cushion receiving portion 32 at the plate 5 is formed as a spring seat 34 and a return spring 35 is disposed between the spring seat 34 and a periphery of the cushion projecting portion 23 of the diaphragm 4.

Furthermore, connecting holes 24 and 25 are respectively formed in positions of a periphery of the diaphragm 4 corresponding to the pilot air supply hole 16 and the pilot exhaust hole 17 of the valve body 3.

The plate 5 for airtightly sandwiching the diaphragm 4 between the plate 5 and the valve body 3 has a flow path for supplying pilot fluid pressure to the driving chamber 14 by the pilot valve 6 disposed on the plate 5. The flow path is formed of an air supply flow path 36 for connecting the pilot air supply hole 16 provided to the valve body 3 to a supply port 41 of the pilot valve 6, an output flow path 37 for connecting an output port 42 of the pilot valve 6 to the driving chamber 14, and an exhaust flow path 38 for connecting an exhaust port 43 of the pilot valve 6 to the pilot exhaust hole 17 of the valve body 3.

The pilot valve 6 has a movable core 47 attracted to a fixed core 46 by energizing a solenoid 45. An exhaust-side valve body 48 provided to the movable core 47 faces a pilot exhaust valve seat provided to the exhaust port 43 and an air supply-side valve body 49 connected to the exhaust-side valve body 48 through a pressing lever (not shown) faces a pilot air supply valve seat provided to the supply port 41. A reference numeral 51 in FIG. 1 designates a manual operation member for use when the movable core 47 does not operate, 52 designates a feeding socket, 53 designates a receiving terminal, and 54 designates a substrate on which electronic parts are placed.

Figure 3:
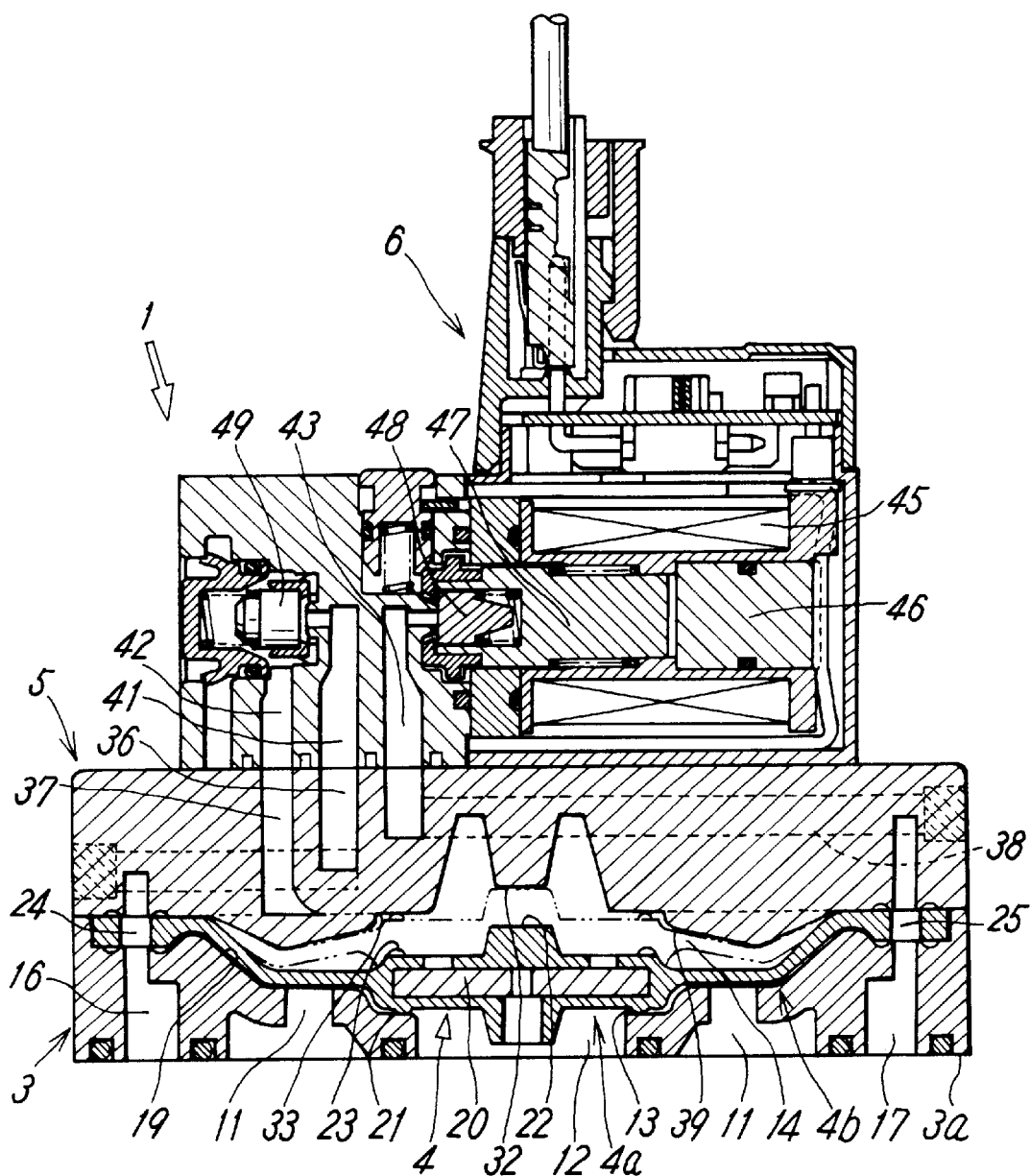
FIG. 3 is a sectional view of a second embodiment of the diaphragm-type solenoid valve according to the invention.

Opposed faces of the valve body 3 and the plate 5 facing the elastic support portion 4b of the diaphragm 4 are formed with diaphragm receiving faces 19 and 39 in shapes patterned on a shape of the elastic support portion 4b. When the diaphragm 4 is pushed by operating force of fluid in opening and closing of the diaphragm 4, the elastic support portion 4b comes in contact with the diaphragm receiving faces 19 and 39 to thereby prevent excessive deformation of the diaphragm 4. The diaphragm 4 in FIG. 1 is shown in a state in which the diaphragm 4 is pressed against the diaphragm receiving face 19 of the valve body 3 by fluid pressure in the driving chamber 14 and the diaphragm shown with a chain line in FIG. 3 is shown in a state in which the diaphragm is pressed against the diaphragm receiving face 39 of the plate 5 by fluid pressure on the sides of the first and second ports 11 and 12.

In the diaphragm-type solenoid valve 1 having the above structure, when the solenoid 45 of the pilot valve 6 is not energized, the valve seat provided to the exhaust port 43 is closed with the exhaust-side valve body 48 as the movable core 47 is returned by the spring and at the same time, the valve seat provided to the supply port 41 is opened by the air supply-side valve body 49, and pilot fluid pressure from the pilot air supply hole 16 is supplied from the air supply flow path 36 and the supply port 41 through the output port 42 and the output flow path 37 to the driving chamber 14 as shown in FIG. 1. As a result, the diaphragm 4 is pressed toward the valve body 3 by pilot fluid pressure in the driving chamber 14 and biasing force of the return spring 35 to close the valve seat 13 and to close the flow path between the first and second ports.

The pilot fluid pressure supplied to and discharged from the driving chamber 14 may be about the same as pressure of main fluid flowing between the first and second ports 11 and 12 or may be higher than the pressure of the main fluid if necessary.

On the other hand, when the solenoid 45 is energized, the valve seat provided to the exhaust port 43 is opened by the exhaust-side valve body 48 and at the same time, the valve seat provided to the supply port 41 is closed with the air supply-side valve body 49, the pilot fluid pressure in the driving chamber 14 is introduced from the output flow path 37 and the output port 42 through a periphery of the pressing lever into a valve chamber where the exhaust-side valve body 48 exists and discharged outside from the valve seat provided to the exhaust port 43 through the exhaust flow path 38 and the pilot exhaust hole 17. As a result, the fluid pressure of the main fluid of the first or second port 11 or 12 presses the diaphragm 4 toward the driving chamber 14 against the biasing force of the return spring 35 to open the valve seat 13 and to open the flow path between the first and second ports.

Because the driving chamber 14 and the flow path for the main fluid between the first and second ports 11 and 12 are separated by the diaphragm 4, the diaphragm-type solenoid valve can be applied to medical main fluid or other various main fluid. Because the disc 20 is encapsulated in the main body portion 4a for opening and closing the valve seat 13 at a center of the diaphragm 4 and the cushion projecting portions 22 and 23 for coming in contact with the cushion receiving portions 32 and 33 provided to the plate 5 in valve opening are formed on the back face of the main body portion 4a, impact force acting on the diaphragm 4 in valve opening can be absorbed to protect the diaphragm 4.

Furthermore, because the diaphragm receiving faces 19 and 39 are formed at the valve body 3 and the plate 5 such that the elastic support portion 4b comes in contact with and is supported by the diaphragm receiving faces 19 and 39 in opening and closing of the diaphragm 4, excessive deformation is generated nowhere in operation of the diaphragm 4 and the diaphragm 4 can be prevented to the utmost from being damaged due to fatigue.

FIG. 3 shows a second embodiment of the diaphragm-type solenoid valve according to the invention. The second embodiment is different from the first embodiment in that the diaphragm 4 is not provided with the return spring 35.

In the second embodiment, unlike the first embodiment, the diaphragm 4 is pressed toward the valve body 3 by only operating force of the pilot fluid in the driving chamber 14. Therefore, in order to close the valve seat 13 to reliably close the flow path between the first and second ports, it is preferable that pressure of pilot fluid supplied to the driving chamber 14 is higher than pressure of main fluid flowing between the first and second ports 11 and 12.

Because there is no difference in other structures and operation between the second embodiment and the first embodiment, main portions in the drawing are provided with the same reference numerals as those in the first embodiment to omit description of them.

Figure 4:
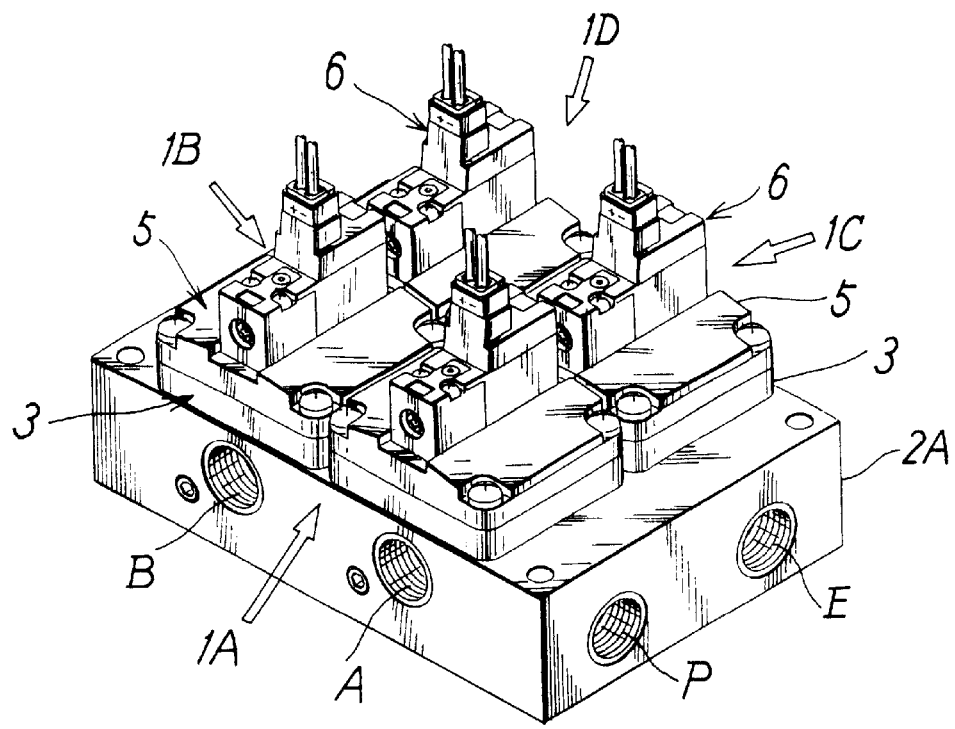
FIG. 4 is a perspective view of an example of a state in which the diaphragm-type solenoid valves of the invention are mounted to a base.
Figure 5:
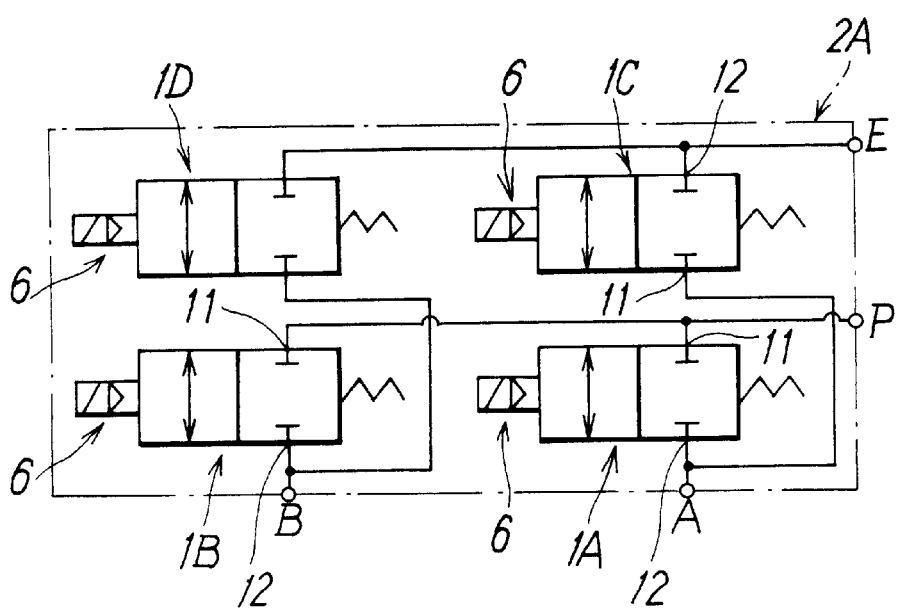
FIG. 5 is a fluid circuit diagram showing a connecting state of the diaphragm-type solenoid valves by the base in FIG. 4 by using symbols.

FIG. 4 shows a state in which a plurality of diaphragm-type solenoid valves 1A to 1D are mounted onto a base 2A having a supply port P, output ports A and B, and a discharge port E to form a diaphragm-type solenoid valve complex body having a function of a three-port valve from the solenoid valves 1A to 1D and the base 2A and FIG. 5 shows a state in which the respective ports and the solenoid valves 1A to 1D are connected through connecting paths in the base 2A by using symbols.

In other words, in positions corresponding to the respective solenoid valves 1A to 1D on a solenoid valve mounting face of the base 2A, openings communicating with the respective ports P, A, B, and E are provided while being connected to have special relationships through the connecting paths in the base 2A, though the openings are not especially shown in the drawings. If the solenoid valves 1A to 1D are mounted to the mounting face, the first and second ports 11 and 12 of the respective solenoid valves are connected to the respective openings.

Specifically, as shown in FIG. 5, the first ports 11 of the first and second solenoid valves 1A and 1B are respectively connected to the supply port P, the second ports 12 of the third and fourth solenoid valves 1C and 1D are respectively connected to the discharge port E, the second port 12 of the first solenoid valve 1A and the first port 11 of the third solenoid valve 1C are connected to the first output port A, and the second port 12 of the second solenoid valve 1B and the first port 11 of the fourth solenoid valve 1D are connected to the second output port B. Therefore, the first and second solenoid valves 1A and 1B respectively have functions of supplying or not supplying fluid from the supply port P to the output ports A and B and the third and fourth solenoid valves 1C and 1D respectively have functions of discharging or not discharging fluid of the output ports A and B.

The base 2A is formed with a supply port and a discharge port for pilot fluid, openings communicating with the respective ports are formed on the solenoid valve mounting face, and the openings are connected to the pilot air supply holes 16 and the pilot exhaust holes 17 of the respective solenoid valves.

Figure 6:
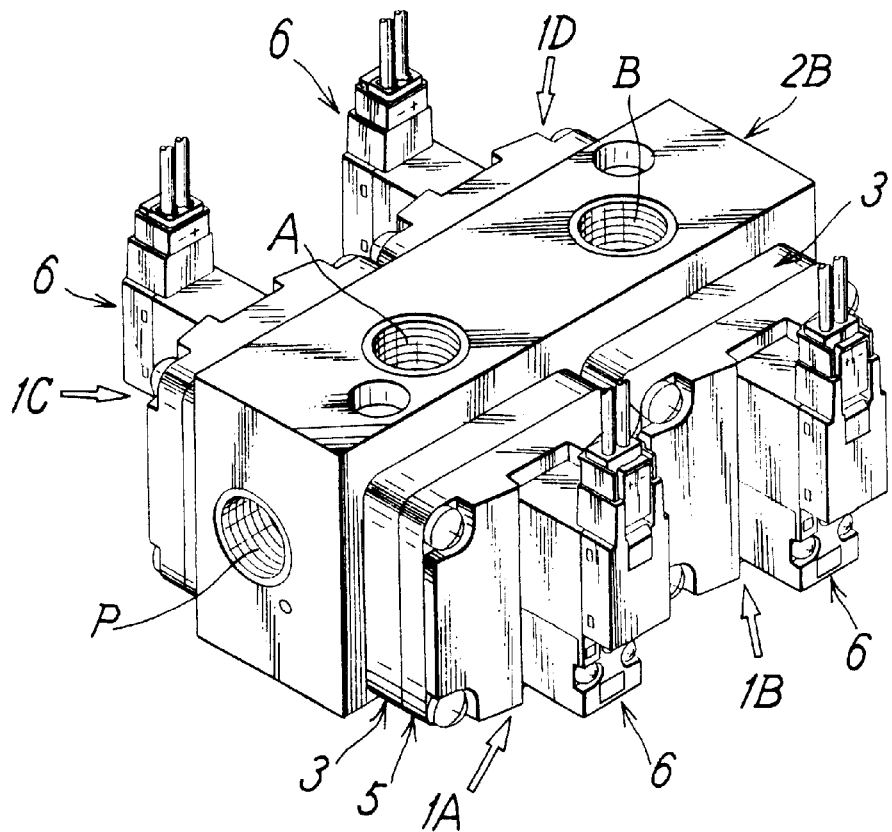
FIG. 6 is a perspective view of another example of the state in which the diaphragm-type solenoid valves of the invention are mounted to the base.
Figure 7:
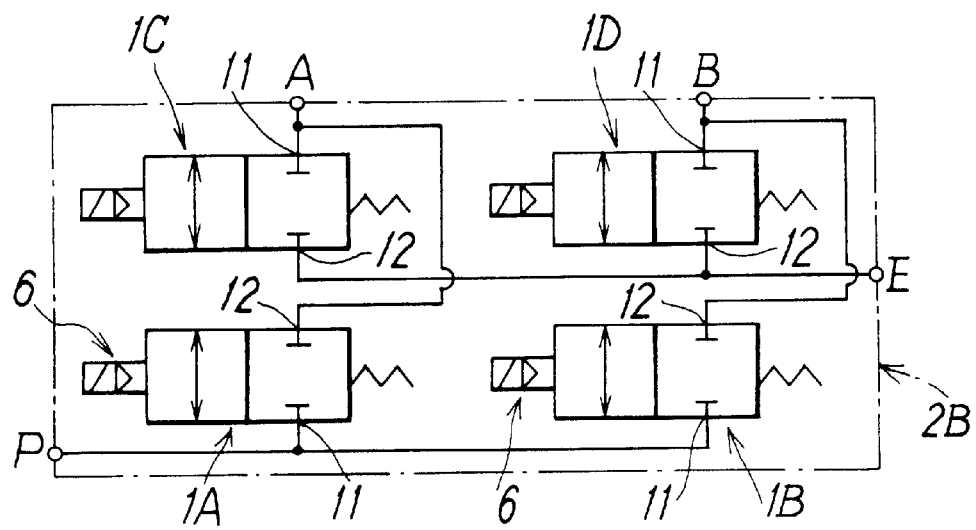
FIG. 7 is a fluid circuit diagram showing a connecting state of the diaphragm-type solenoid valves by the base in FIG. 6 by using symbols.

FIG. 6 shows a state in which a plurality of diaphragm-type solenoid valves 1A to 1D are mounted onto another base 2B and FIG. 7 shows a state in which the respective ports provided to the base 2B and the solenoid valves 1A to 1D are connected through connecting paths in the base 2B by using symbols.

A structure shown in FIG. 6 is different only in that the base 2B has solenoid mounting faces on its two opposed faces and has two solenoid valves on each face and that the supply port P and the discharge port E separately open in the two opposed faces of the base and the structure in FIG. 6 is substantially the same as that in FIG. 4 in relationships of connection between the respective ports P, A, B, and E on the base 2B and the first and second ports 11 and 12 in the respective solenoid valves 1A to 1D.

Besides the examples in FIGS. 4 and 6, it is also possible to mount two diaphragm-type solenoid valves on a base having a supply port P, one output port A, and a discharge port E to form a diaphragm-type solenoid valve complex body having a function of a three-port valve or it is possible to mount one diaphragm-type solenoid valve on a base having two ports to form a diaphragm-type solenoid valve complex body having a function of a two-port valve.

As described above, according to the diaphragm-type solenoid valve having the above structure, it is possible to mount a single diaphragm-type solenoid valve or a combination of a plurality of diaphragm-type solenoid valves on a base having a proper flow path to form a diaphragm-type solenoid valve complex body having a function of a two-port valve, a three-port valve or other arbitrary functions according to the flow path formed in the base. According to the flow path provided in the base, it is possible to apply various flow path structures.

According to the diaphragm-type solenoid valve of the invention which has been described above in detail, it is possible to obtain various flow path structures by mounting the valve bodies of the required number of diaphragm-type solenoid valves to the base having the proper flow path and to obtain a diaphragm-type solenoid valve in which a sliding portion and excessive deformation are generated nowhere in operation of the diaphragm and the diaphragm can be prevented from being damaged due to fatigue or the like.

What is claimed is:

1. A diaphragm solenoid valve comprising a valve body having a first port and a second port for main fluid in a mounting face to be mounted to a base, a valve seat mounted in a flow path connecting both said ports, a diaphragm for opening and closing said valve seat, a plate for sandwiching and fixing an outer peripheral portion of said diaphragm between said plate and said valve body, a driving chamber formed between said plate and said diaphragm to be separated from said flow path, and a pilot valve disposed on said plate to supply pilot fluid different from said main fluid to said driving chamber, wherein said diaphragm has a central main body portion for opening and closing said valve seat and an elastic support portion surrounding said main body portion, a disc is encapsulated in said main body portion, a sealing rib for coming in contact with and separating from said valve seat is provided to one face of said main body portion, and a cushion projecting portion for coming in contact with a cushion receiving portion of said plate in valve opening is formed on a back face of said main body portion.

2. A diaphragm solenoid valve according to claim 1, wherein diaphragm receiving faces in shapes patterned on a shape of said elastic support portion are formed on opposed faces of said valve body and said plate facing said elastic support portion of said diaphragm and said elastic support portion comes in contact with said diaphragm receiving faces in opening and closing of said diaphragm to thereby prevent excessive deformation of said diaphragm.

3. A diaphragm solenoid valve according to claim 1, wherein said first port is in an annular shape and said second port opens at a center of said first port.

4. A diaphragm solenoid valve according to claim 1, wherein a pilot air supply hole and a pilot exhaust hole communicating with said pilot valve are provided to said mounting face of said valve body.

5. A diaphragm solenoid valve complex body formed by mounting one diaphragm solenoid valve according to claim 1 onto a base having a supply port and an output port for main fluid and connecting each of said first and second ports to one of said supply port and said output port so as to have a function of a two-port valve by said solenoid valve and said base.

6. A diaphragm solenoid valve complex body formed by mounting a plurality of diaphragm-type solenoid valves according to claim 1 onto a base having a supply port, at least one output port, and a discharge port for main fluid and connecting said supply port, said output port, and said discharge port to first and second ports of said respective solenoid valves by a connecting path in said base so as to have a function of a three-port valve by said plurality of solenoid valves and said base.

7. A diaphragm solenoid valve complex body according to claim 6, wherein said base has first and second two output ports, first to fourth four diaphragm solenoid valves are mounted onto said base, said first ports of said first and second solenoid valves are respectively connected to said supply port, said second ports of said third and fourth solenoid valves are respectively connected to said discharge port, said second port of said first solenoid valve and said first port of said third solenoid valve are connected to said first output port, and said second port of said second solenoid valve and said first port of said fourth solenoid valve are connected to said second output port.

* * * * *